United States Patent
Khan

(10) Patent No.: US 11,101,923 B2
(45) Date of Patent: Aug. 24, 2021

(54) RECEIVER CIRCUITRY FOR PHYSICAL CODING SUBLAYER

(71) Applicant: Intel Corporation, Santa Clara, CA (US)

(72) Inventor: Faisal Khan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 15/855,434

(22) Filed: Dec. 27, 2017

(65) Prior Publication Data

US 2019/0044650 A1 Feb. 7, 2019

(51) Int. Cl.
*H04L 1/00* (2006.01)
*H04L 1/18* (2006.01)
*H04L 7/00* (2006.01)

(52) U.S. Cl.
CPC .......... *H04L 1/0039* (2013.01); *H04L 1/0006* (2013.01); *H04L 1/0072* (2013.01); *H04L 1/1812* (2013.01); *H04L 7/00* (2013.01)

(58) Field of Classification Search
CPC ... H04L 1/0039; H04L 1/0071; H04L 1/0072; H04L 25/14; H04L 7/0025; H04L 7/081
See application file for complete search history.

(56) References Cited

U.S. PATENT DOCUMENTS

| 7,978,802 | B1 * | 7/2011 | Raha | H04L 7/0025 375/371 |
| 2010/0092174 | A1 * | 4/2010 | Brown | H04L 1/0071 398/79 |
| 2013/0101069 | A1 * | 4/2013 | Barner | H03K 19/20 375/316 |
| 2018/0041332 | A1 * | 2/2018 | Yang | H04J 3/0658 |

* cited by examiner

*Primary Examiner* — Shelly A Chase
(74) *Attorney, Agent, or Firm* — Fletcher Yoder, P.C.

(57) ABSTRACT

Circuitry and methods for receiving data that may be compliant with a specific protocol is discussed. The described systems may be employed to implement a physical media access (PMA) sublayer and/or physical coding sublayer (PCS) for high-speed Ethernet protocols. Embodiments described herein may have reduced circuitry footprint that may be achieved by the use of a single recovered clock to drive the operations of PCS circuitry. Efficient use of components may also be achieved by the use of smaller-sized words for processing by the PCS circuitry. The circuitry may process the smaller-sized words by implementing pipelined circuitry. Implementations that employ programmable circuitry, hardened circuitry, or hybrid implementations are also discussed.

20 Claims, 14 Drawing Sheets

RECEIVER CIRCUITRY FOR PHYSICAL CODING SUBLAYER

BACKGROUND OF THE DISCLOSURE

The present disclosure relates generally to communication circuitry for electronic devices, and more specifically to receiver circuitry that may implement a physical coding sublayer functionality for network communication.

Certain electrical devices may be communicatively coupled to other electrical devices through communication networks. The communication networks may employ shared communication channels that may have certain specifications and/or protocols. One example of communication protocol is the IEEE 802.3 Ethernet protocol, which may include rules and standards for packages that exchanged between communication devices. Communication protocols, such as the Ethernet protocol and other Open Systems Interconnection (OSI) compliant protocols, may include a stack of abstraction layers.

Media layers, such as Physical Layer, a Data Link Layer, and Network Layer may describe specifications and rules for accessing the channel, adding addresses and tags to packages, and other channel related functions. Many electrical devices may include dedicated circuitry to implement the specifications of these abstraction layers. The separated implementation of some abstraction layers in dedicated circuitry may allow modular design of the electrical device, and decreased design and implementation errors in the dedicated circuitry. As speeds increase and the standards evolve, changes in the design and implementation of circuitry that implement these lower level layers may improve compliance of the network circuitry with the existing protocols and improve the performance of electrical devices that use it.

BRIEF DESCRIPTION OF THE DRAWINGS

Advantages of embodiments may become apparent upon reading the following detailed description and upon reference to the drawings in which.

DETAILED DESCRIPTION OF SPECIFIC EMBODIMENTS

Figure 1:
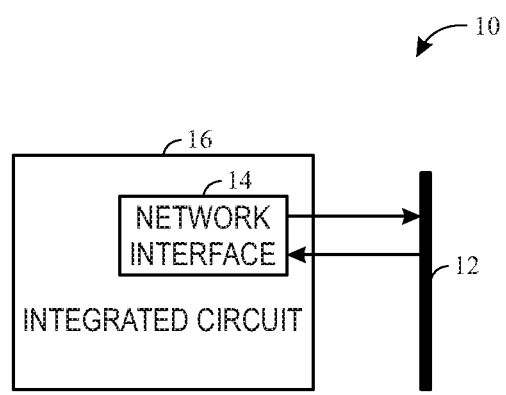
FIG. 1 illustrates an electronic device that may couple to a network using receiver side circuitry, in accordance with an embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain network protocols, such as the IEEE 802.3 Ethernet protocol, may have a specification that includes multiple abstraction layers, in accordance with the 7-layer Open Systems Interconnection (OSI) model. The lowest abstraction layer, the physical (PHY) layer, may include rules and specifications to access the physical channel (e.g., electrical wire, optical fiber, electromagnetic spectrum, etc.). The PHY layer may include a physical medium attachment sublayer (PMA) and a physical coding sublayer (PCS), which may implement operations related to receiving Ethernet packages from the physical medium, de-interleaving the received packages, identifying the words, performing word alignment, and assembling the Ethernet packages, among other low-level packet management tasks. These tasks may be performed by dedicated circuitry located in a network adaptor of an electrical device, and may implemented by an application specific integrated circuit (ASIC) and/or a programmable logic device (PLD), which may be a field-programmable gate array (FPGA). The functions associated with implementation may be provided as hardened circuitry, soft circuitry (e.g., programmable circuitry), or a combination of both (e.g., hybrid circuitry).

Increases in the data rate (e.g., speed) of Ethernet connections may lead to changes in the standard specifications and/or lead to decrease in the efficiency of older implementations of network adaptors. Embodiments described herein are related to receiver side PCS implementations that may include solutions that may be of benefit to adaptors operating at faster Ethernet speeds. These implementations may be used, for example, to assemble network circuitry that is capable of operating with high data rate standards, such as 10, 25, 50, 40, 100, 200, and/or 400 Gbit/s, as may be specified in the 10G, 25G, 50G, 100G, Ultra, and Terabit Ethernet standards proposed and/or specified by the IEEE 802.3 task force. The implementations described herein may be better compliant with the higher speed Ethernet protocols. The architecture described herein may provide improved utilization of resources and may present increased efficiency. Embodiments described herein may include features such as utilization of short words (e.g., 13 or 14-bit words) instead of long words (e.g., 66-bit Ethernet words) within the circuitry of the PCS, which may allow simplification of the components of the circuitry. Embodiments may also employ a single, unified, clock (which may be a recovered clock from a PMA), which may decrease the circuitry used for driving the operations described herein. These embodiments may allow use of simplified data gearbox, as detailed below. Moreover, the modular feature described herein may facilitate the design process of implementations.

With the foregoing in mind, FIG. 1 illustrates an electrical device 10 that may be coupled to a physical medium 12 of a communication network. Electrical device 10 may couple to the physical medium 12 through a network interface 14. Network interface 14 may be a part of an integrated circuit 16, which may be an ASIC, an FPGA, a hybrid device. Network interface 14 may be implemented as hard logic, soft logic, or a combination, as discussed above. Network interface 14 may implement functionality that allows the electrical device 10 to be compliant with Ethernet standards. Network interface may, for example, include circuitry to implement PMA and/or PCS layers to send data and/or receive data to the physical medium 12. Embodiments of PMA and PCS layers may receive electrical signals from the physical medium 12 in a PMA, assemble Ethernet packages in a PCS, and provide packages to a media access control (MAC) circuitry. In some embodiments, the packages that may be provided to a media access control (MAC) layer using a media-independent interface (MII).

Figure 2:
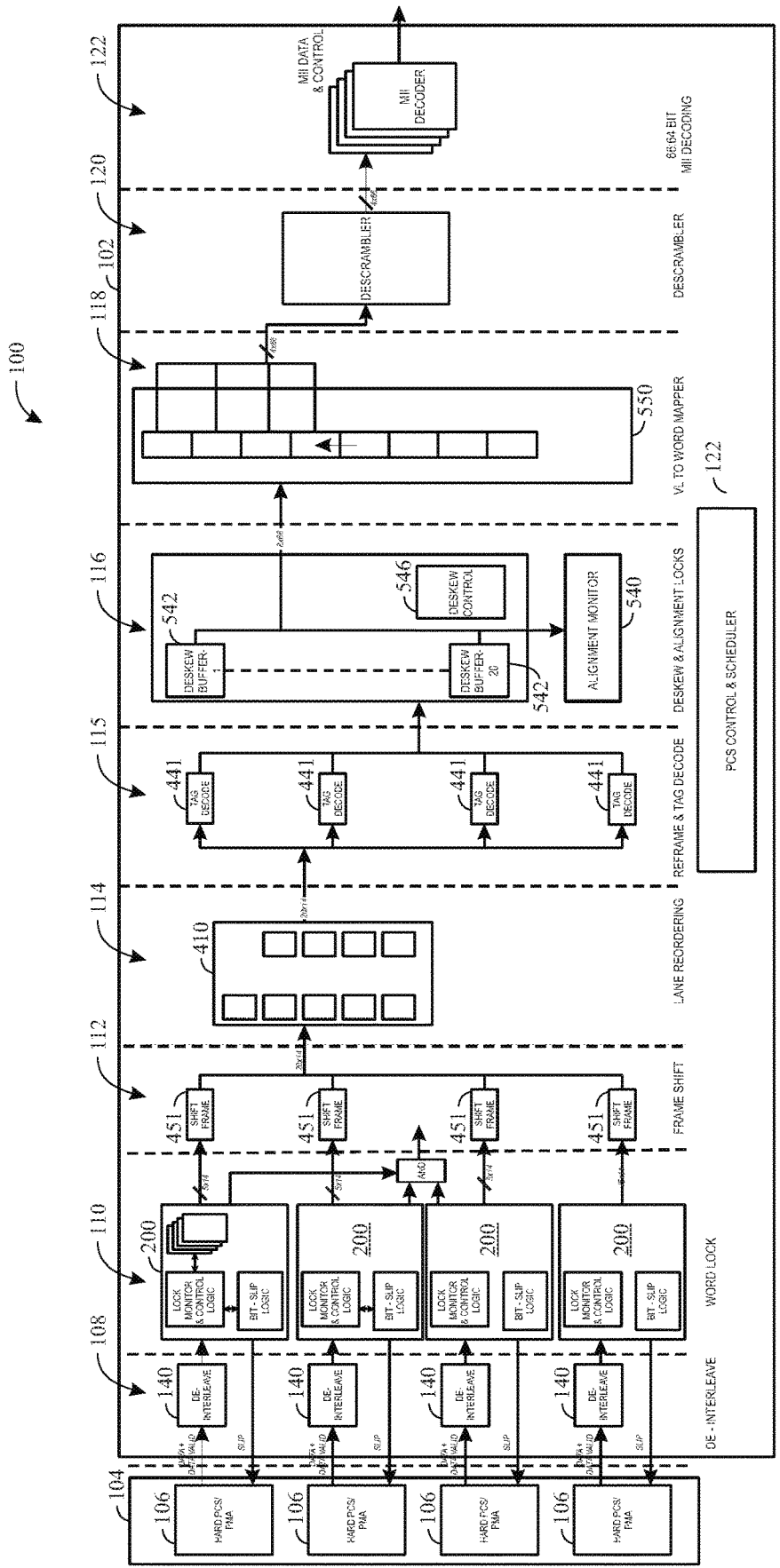
FIG. 2 illustrates a diagram for receiver side circuitry that may be used to receive Ethernet packages from a network, in accordance with an embodiment.

FIG. 2 illustrates a schematic diagram of a receiver side PMA and PCS 100. The receiver side PMA and PCS 100 may have a soft-implemented RX PCS circuitry 102 and hardened circuitry 104. Hardened circuitry 104 may implement PMA and/or PCS functions, and may include receiving modules 106 which may include transceivers, clock and data recovery circuitry, digital-to-analog converter, eye detection circuitry, and other circuitry that may assist in receiving electrical signals from a channel and converting them into digital signals for processing. Clock and data recovery circuitry may further provide a recovered clock signal associated to the received digital signals. The RX PCS circuitry 102 may include circuitry to perform functions that may include de-interleaving circuitry 108, word locking circuitry 110, frame shift circuitry 112, lane reordering circuitry 114, tag-decoding and reframing circuitry 115, deskew and alignment locking circuitry 116, virtual-lane to word mapping circuitry 118, descrambling circuitry 120, and MII decoding circuitry 122. RX PCS circuitry 102 may also include a controller and scheduler 123 that may coordinate operation of the multiple modules of the RX PCS circuitry 102. Detailed implementations of the circuitries and/or modules that perform the above-referenced functions in the RX PCS circuitry 102 are detailed below. It should be noted that, while the present specification provides an example related to 66-bit Ethernet packages with 64-bit content, the disclosure may be modified to be used with data packets of other lengths.

Figure 3:
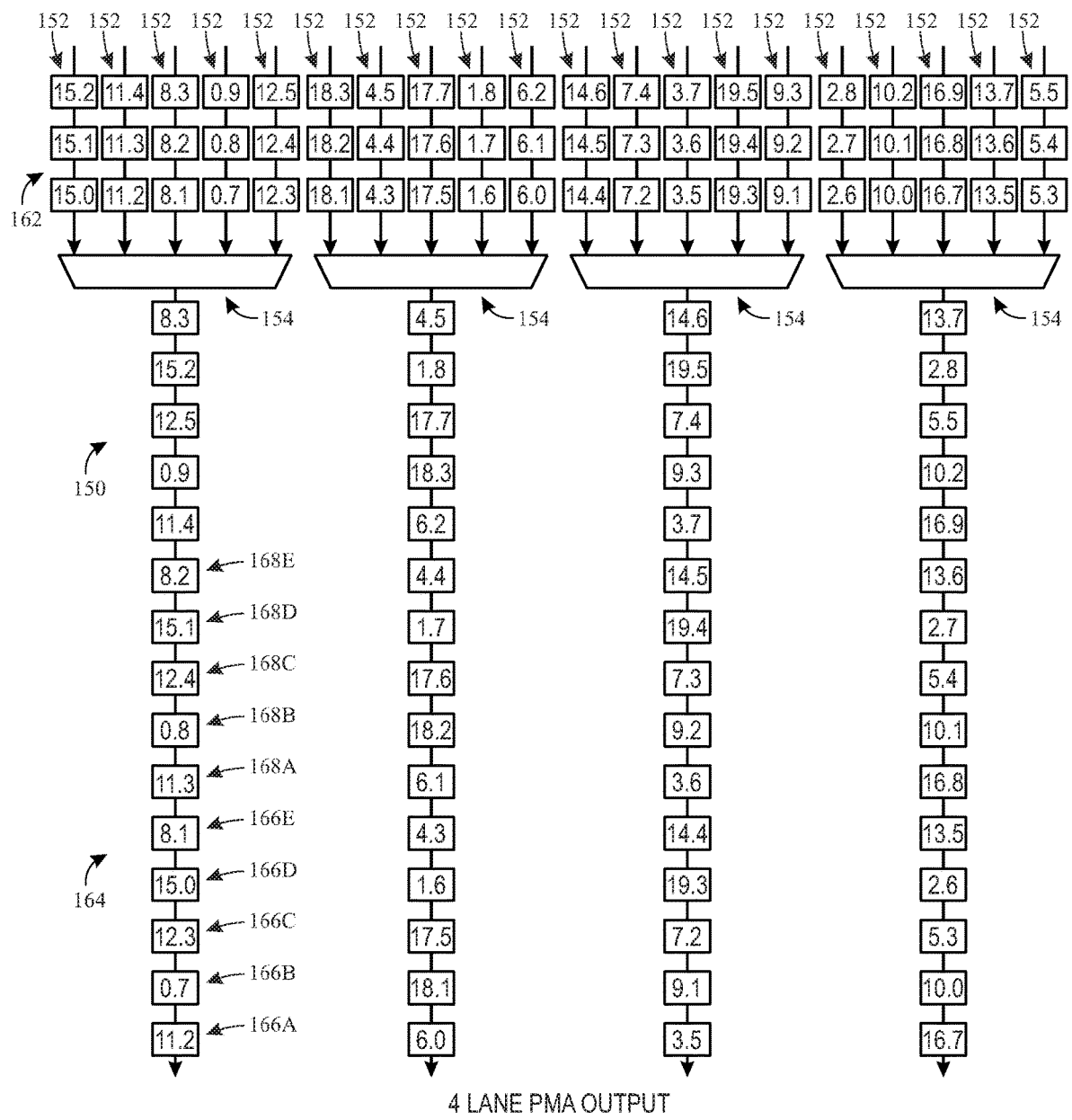
FIG. 3 illustrates data interleaving that may be used to send and receive data using virtual channels over a network, in accordance with an embodiment.

Data received by the receiving modules 106 in the hardened circuitry 104 may comply with an attachment standard, such as the C attachment unit interface 4 (CAUI4) standard. The CAUI standards may include interleaving standards. Interleaving standards may include bit-wise interleaving of multiple virtual lanes. The interleaved virtual lanes may be de-interleaved by de-interleaving modules 140 of de-interleaving circuitry 108. For example, an Ethernet word may have 66-bit words that may be distributed among 5 virtual channels, each channel having a short word of 13-bits or 14-bits (e.g., four 13-bit words and one 14-bit word). FIG. 3 illustrates an example of interleaved serial data 150 that may be transmitted by a CAIU4 standard. In the interleaved serial data 150, each is physical lane, or channel 154 may include 5 virtual lanes 152. Accordingly, in the CAUI4 standard, 20 virtual lanes 152 may be interleaved in 4 channels 154.

Each channel 154 may receive the 5 interleaved virtual lanes, as illustrated, and each virtual lane 152 may carry Ethernet words and/or packages, which may be 66-bit words. De-interleaving modules 140 may receive data from the hardened circuitry 104, and may provide data de-interleaved for processing of the package. For de-interleaving, received data corresponding to the virtual lanes 152 may be bit-multiplexed employing a round-robin strategy at each channel 154, as the order of the position of each virtual lane 152 within the channel 154 may be fixed. This may be illustrated by comparing the received interleaved serial data 150 with the multiplexed virtual channels 162. As a result of the bit-multiplexing of the virtual channels 152 in the physical channels 154, data bits 166A, 166B, 166C, 166D, and 166E may belong to the same virtual lane 152 as that of data bits 168A, 168B, 168C, 168D, and 168E, respectively.

The de-interleaving modules 140 may employ a round-robin algorithm to process the incoming interleaved serial data 150 to produce short words (e.g., 13-bit or 14-bit short words) that belong to a single virtual channel 152. Reconstruction of the short words may take place by iteratively assigning each consecutive bit of the interleaved serial data 150 of a physical channel 154 to one of the corresponding 5 virtual lanes 152 at each clock cycle. For example, in the first five clock cycles, the first bit of each of the virtual lanes may be grouped. From the sixth through tenth clock cycles, the second bit of each of the virtual lanes may be grouped. This process may be iterated until the last bit (e.g., thirteenth or fourteenth bit) of each virtual lane is grouped, forming 5 short words, as discussed above. In embodiments in which each virtual lane carries 66-bit Ethernet word, which may be broken into four 13-bit words and one 14-bit word, a round robin algorithm may be used to assign the virtual lane 152 of the physical channel 154 that has the 14-bit word in each cycle. As a result of this round robin algorithm, each physical lane may have 5 66-bit Ethernet words, each word from one virtual lane 152, and each word divided in short words of 13-bits or 14-bits. As a result of this process, each de-interleave module 140 of de-interleaving circuitry 108 may provide 5 short words to the word locking circuitry 110

Figure 4:
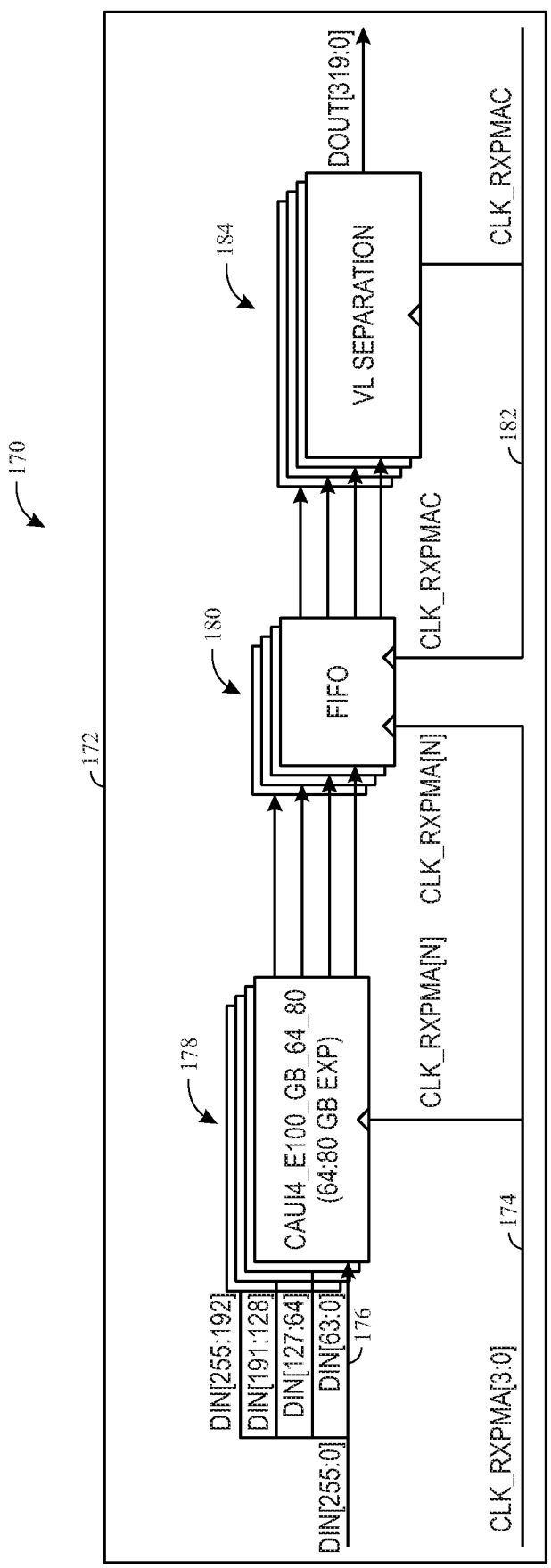
FIG. 4 illustrates adaptor circuitry that may be used to extract virtual lanes from an input channel data in the receiver side circuitry of FIG. 2, in accordance with an embodiment.

De-interleaving circuitry 108 may also process incoming data from 64-bit circuitry to de-interleave data that interfaces with a 64-bit PMA receiving blocks 106. Diagram 170 in FIG. 4 illustrates a CAUI4 adaptor 172 that may be used obtain data from CAUI-4 standard that may be compatible with the RX PCS circuitry 102. CAUI4 adaptor 172 may receive clock and data from four clock and data recovery (CDR) modules, each associated to a channel. CAUI4 adaptor 172 receives four clocks 174 that may clock 4 64-bit words 176 that may be received by gearboxes 178. Each gearbox 178 may convert the received 64-bit words 176 into, for example, 80-bit words for compatibility. The 80-bit words may then be provided by a first in first out (FIFO) 180 or an elastic buffer, which may receive the four clocks 174 for latching the FIFO 180 input. The FIFO 180 output may be clocked by a single clock 182, which may be used as a core clock by RX PCS circuitry 102. A second module 184 may receive the data from the FIFO 180 and separate the 20 virtual lanes and perform de-interleaving, as discussed above.

Word locking circuitry 110 may include word locking modules 200 may perform function such as identifying and delineate 66-bit Ethernet word boundaries. As discussed above, Ethernet packages may have 66-bit words, of which 64 bits may be package content and 2 bits may be a comma or a header that may be used to identify a beginning of the package (Ethernet word). Word locking modules 200 may seek to identify headers in the short-words received from the de-interleaving circuitry 108. If word locking modules 200 identify the header in the beginning of the short-words, the word alignment may be proper. If word locking modules 200 do not identify the header in the beginning of the short-words, it may request bit slipping (i.e., addition of a delay of one bit) from the PMA receiving modules 106. The word locking module 200 may request bit slipping from PMA receiving modules 106 until it detects that the header is in the beginning of the short-words or it may implement bit slipping internally.

The flow chart 202 illustrates a system that can perform the above described function. Following a reset instruction 204, the circuitry may set the BLOCK_LOCK and TEST_SH variables to FALSE (process 206). Following a setup in process 206, a reset counter process 208 may reset a SH_CNT (header counter), a SH_INVLD_CNT (invalid header counter), and a SLIP_DONE state variable. If the BLOCK_LOCK is FALSE, a test for the header may be performed (process 210). If the header is valid, the header counter SH_CNT is incremented, and the header may be tested again in process 210, as shown by iteration 213. If the test succeeds for 64 consecutive iterations, the BLOCK_LOCK may be set as true (i.e., the word alignment is locked) in process 214, and the system may return to the reset counter process 208 in a locked state. If following a test in process 210 the header is invalid, BLOCK_LOCK may be set to FALSE and a slip may be requested (e.g., a bit-slip request for PMA receiving modules 106) in process 216. Once the slip is finalized, the system may return to the reset counter process 208 to verify if the requested slip is sufficient to fix the header validity.

Following reset counter process 208, if the BLOCK_LOCK is TRUE, test for the header may be performed to ensure that the word lock is valid. If 65 invalid blocks headers are identified in a window size of 1024 blocks, the word lock state is undone. A test process 218 may be performed. If the header is valid, (process 220) the header counter is incremented and process 218 is repeated. If the header is invalid, the header counter is incremented and the invalid header counter is incremented (process 222). If the invalid header counter error is below 65, process 218 may be repeated. If following process 222 the invalid header counter becomes larger than 65 (i.e., more than 65 invalid headers in a 1024 block window), process 216 may be performed to unlock the word lock state and to request a slip. If following processes 220 and/or 222 the invalid counter remains below 65 and the header counter is above 1024, the circuitry may return to the reset counter process 208.

Figure 6:
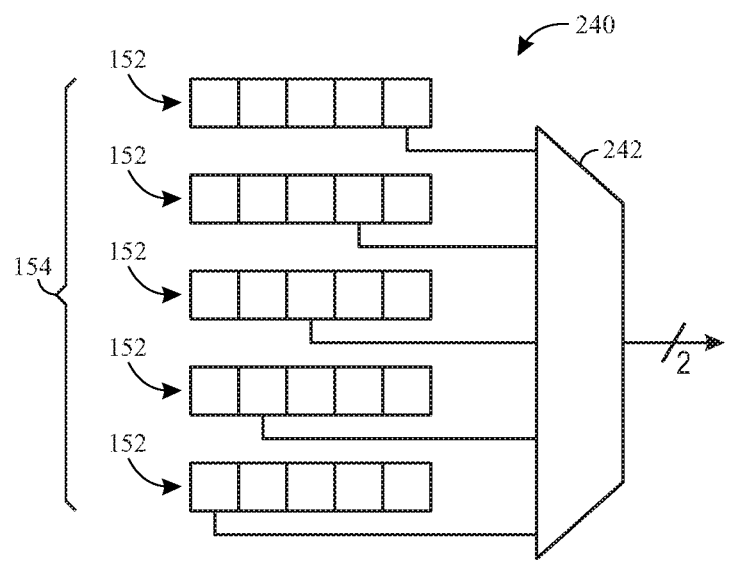
FIG. 6 illustrates a functional diagram of circuitry that may be used to identify headers for word locking functionality and may be implemented in the receiver side circuitry of FIG. 2, in accordance with an embodiment.

Diagram 240 in FIG. 6 illustrates circuitry that may perform operations in the word locking circuitry 110 of the RX PCS circuitry 102. A word header logic 242 may receive short-words may be received from 5 virtual lanes 152 from de-interleaving circuitry 108, as discussed above. At a given cycle, four lanes may have a 13-bit word and one lane may have a 14-bit word. Since the header of Ethernet package may occur once per 66-bit package, and the word locking circuitry 110 receives 5 short-words that may be out of order, the header checking may be performed with all short-words from the virtual lanes 152 separately. The 5 virtual channels 152 having short-words may be pipelined into word header logic 242 in a time-division multiplexing manner. If the pipelined word header logic 242 does not identify four 13-bit short words and one 14-bit short word, the word header logic 242 may indicate misalignment, which may be corrected by implementing slipping.

Figure 5:
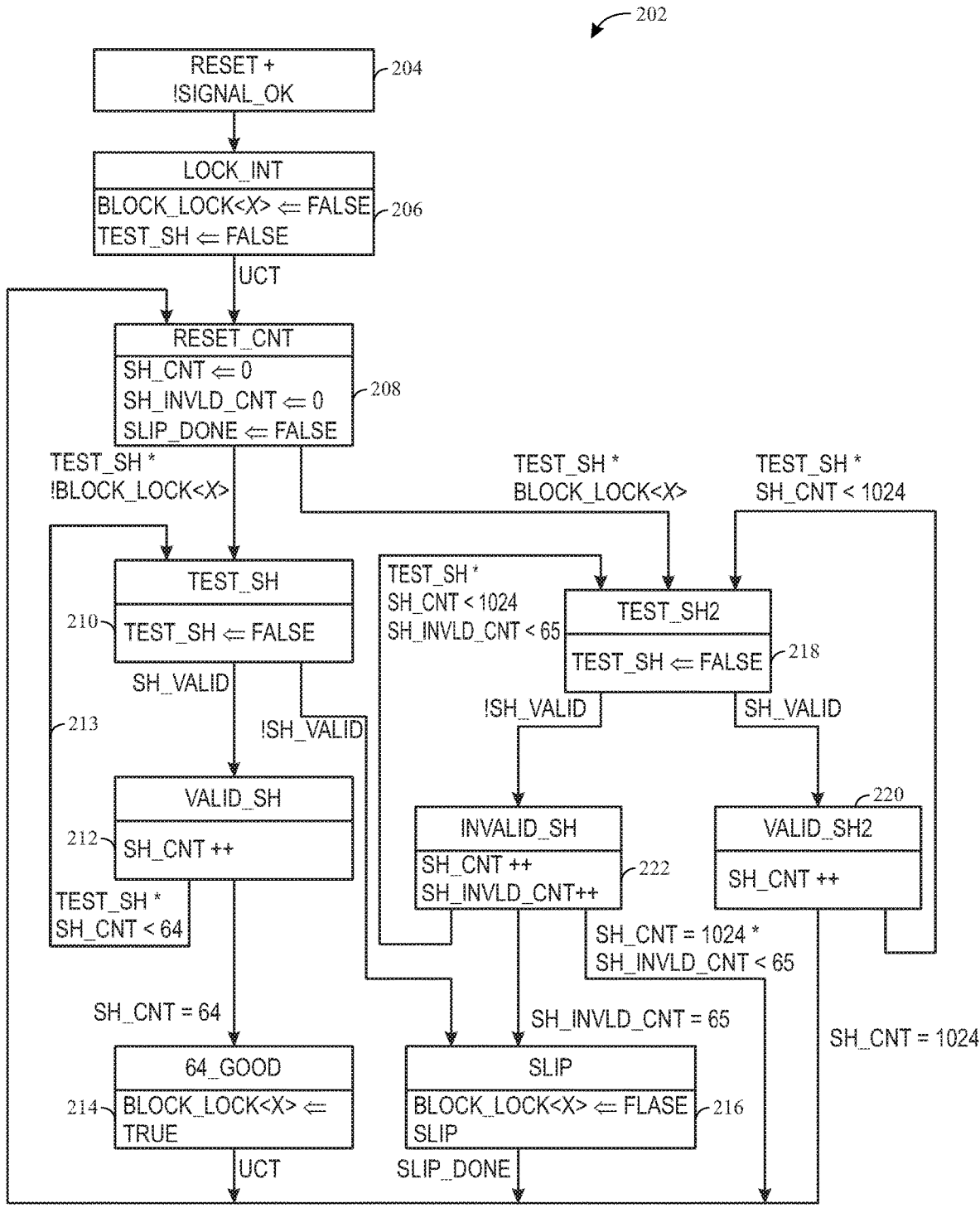
FIG. 5 illustrates a method to lock Ethernet blocks using synchronization headers and may be implemented in the receiver side circuitry of FIG. 2, in accordance with an embodiment.
Figure 7:
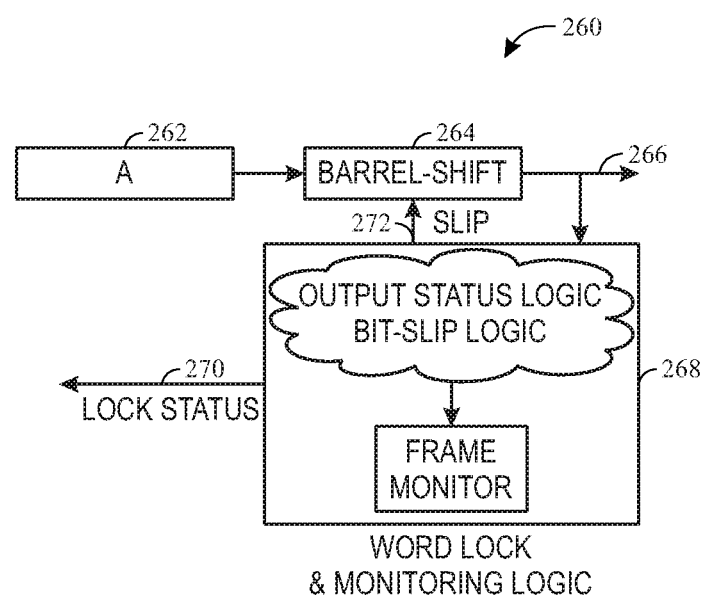
FIG. 7 illustrates a functional diagram of circuitry that may verify word alignment and implement bit-slips and shifts of received words which may be used in the receiver side circuitry of FIG. 2, in accordance with an embodiment.

FIG. 7 illustrates schematically a word lock logic 260 that may be used to monitor the frame, identify a header, and insert a bit-slip to adjust alignment. In the word lock logic 260, the 5 virtual lanes may be time-multiplexed such the word lock logic 260 receives one word 262 in each iteration. In such system, word 262 pass through a barrel-shift circuitry 264, which may add a one-bit delay to data (e.g., perform bit-slip). In word lock logic 260, the barrel-shift circuitry 264 may be a 65-bit barrel shifter and may process 66-bit of a virtual-lane in a single iteration. The output 266 of barrel-shift circuitry 264 may be monitored by a monitoring circuitry 268. Circuitry 268 may be designed to operate according to the flow chart of FIG. 5 to provide lock status 270 and/or slip requests 272. The slip request may be received by barrel-shift circuitry 264 and performed internally, instead of implemented by PMA receiving modules 106. As a result of the slip requests, barrel-shift may add a delay of up to 65-bits for data alignment.

Figure 8:
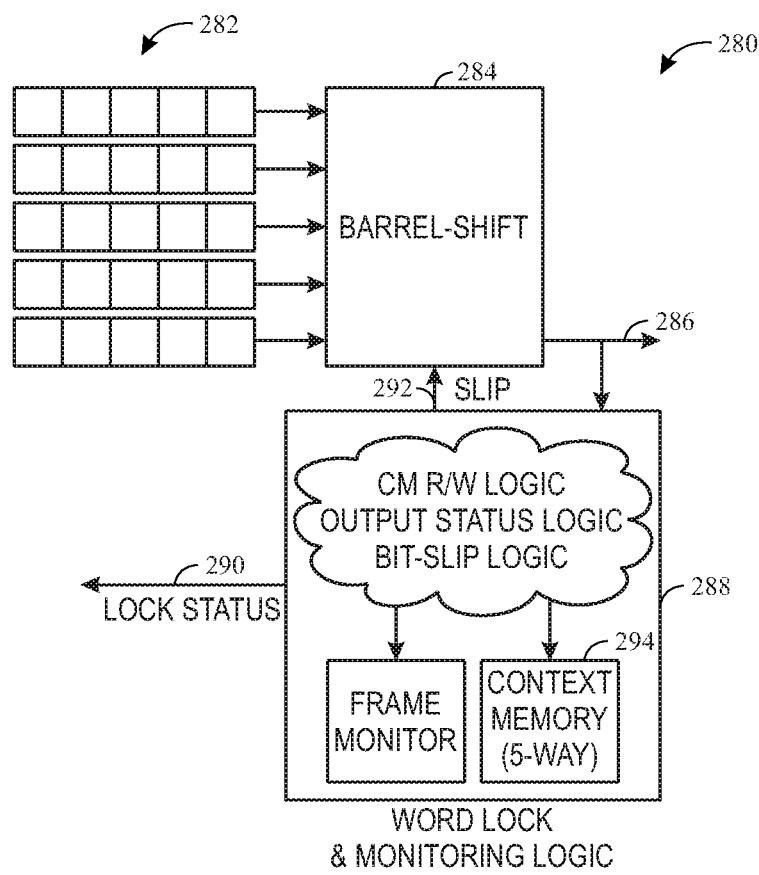
FIG. 8 illustrates a functional diagram of circuitry that may verify word alignment and implement bit-slips and shifts of multiple received short-words, and may be used in the receiver side circuitry of FIG. 2, in accordance with an embodiment.

Word lock logic may also operate on the 5 virtual lanes simultaneously. This process may be performed by circuitry that implements barrel shifting in parallel, as illustrated by the schematic diagram 280 in FIG. 8. Data from 5 virtual lanes 282 may be received by barrel-shift circuitry 284, and its aligned output 286 may be provided for further processing.

Monitoring circuitry 288 may monitor output 286 and may perform determine lock status 290 and/or slip requests 292, as discussed above. Note that since the system is receiving 5 words, and further, that the header position in each of the 5 words is independent, identification of the lock status may be assisted by the addition of a contextual memory 294, which may be a 5-way memory. For example, each lane of the data from 5 virtual lanes 282 may associated with a register (e.g., a multi-bit register) which may store an invalid header counter that counts how many short words with invalid headers the corresponding lane provided. A 5-bit lock status 290 may indicate via a lock bit if the words in a virtual lane are properly aligned or via sticky error bit if the lane is not properly providing a header. For example, if one of the virtual lanes is providing valid headers and an individual locked status, the bit in the lock status 290 corresponding to that virtual lane may be true and no slip is requested. By contrast, if the virtual lane is not properly aligned, the lock status 290 associated with that lane may be false and a slip request 292 for that lane may be forwarded to barrel-shift circuitry.

Figure 9:
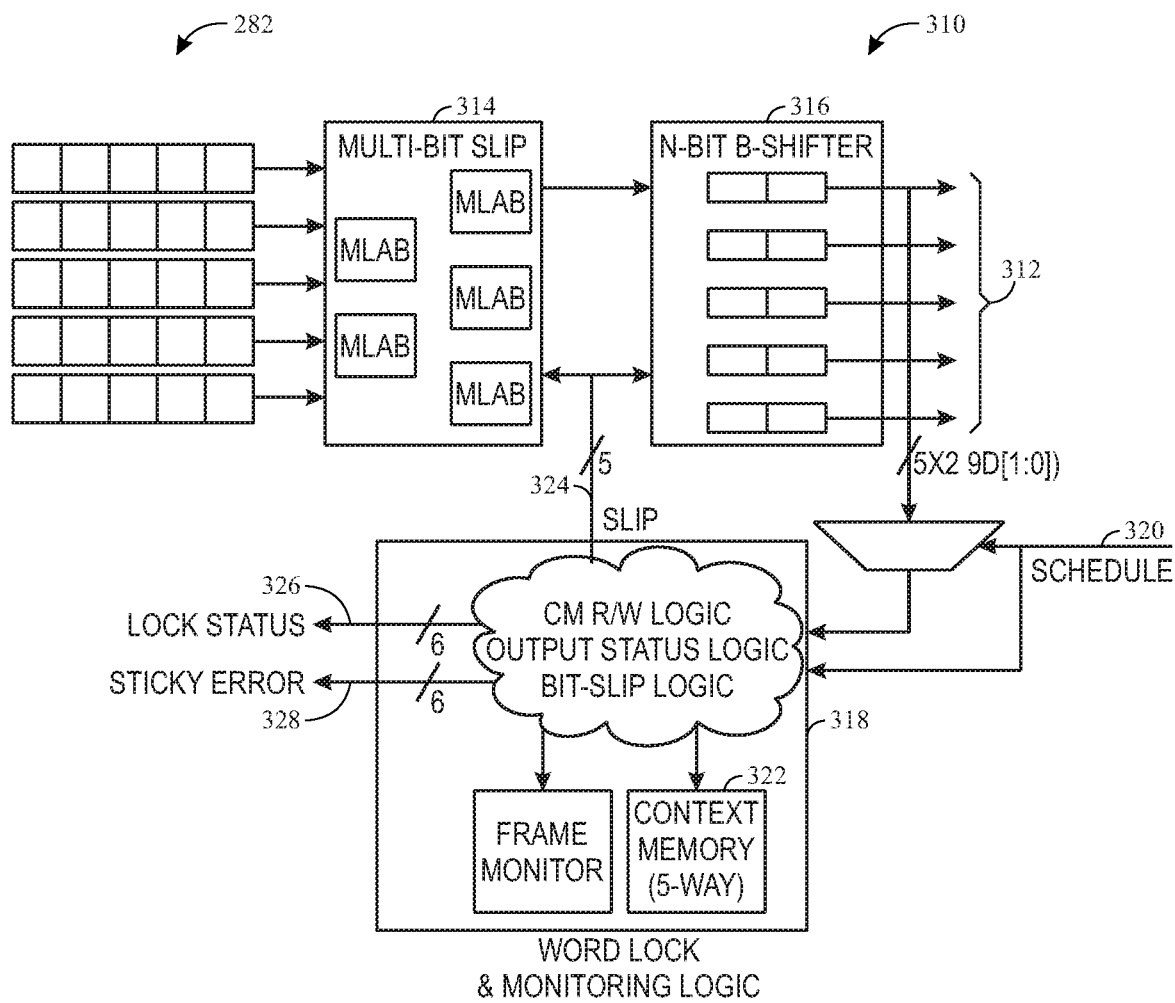
FIG. 9 illustrates a functional diagram of circuitry that may verify Ethernet word (or block) alignment and implement bit-slips and shifts of multiple received short-words, and may be used in the receiver side circuitry of FIG. 2, in accordance with an embodiment.

When processing multiple virtual lanes, one-bit bit slipping may cause skews in the word boundary due to the corresponding position. The word lock logic 310, in FIG. 9, may bit-deskew word boundaries to provide aligned words 312 employing a multi-bit slip circuitry 314 associated with the barrel-shifter 316. The multi-bit slip circuitry 314 may be implemented in soft logic, using memory logic array blocks (MLABs). The width of the MLAB words in multi-bit slip circuitry 314 may depend on the width of the bit-shifter 316. The aligned short words 312 output may be sent to word lock logic circuitry 318. Word lock logic circuitry 318 may read one virtual lane at a time, as defined by the scheduler 320.

As discussed above, word lock logic circuitry 318 may analyze each virtual lane individually, and further, may store contextual memory information for each virtual lane individually, e.g., in a 5-way contextual memory 322. The contextual memory 322 may include in a vector bits such as a 7-bits good/error count, a 1-bit lock status, a 2-bit skip/next check block, a 1-bit sticky error block, a 1-bit max bit shift, and/or a 7-bit shift information data. As such, 5-way contextual memory may be have 5 words of 19-bits each. Word lock logic circuitry 318 may also provide a 5-bit slip command 324 which may be sent to multi-bit slip circuitry 314 and the n-bit barrel-shifter 316. Word lock logic circuitry 318 may further report the lock status 326 of each individual channel as well as the lock status 326 for the alignment of the received 66-bit word, which may be determined from the contextual memory 322. Moreover, the word lock logic circuitry 318 may also report a sticky error status 328 of each individual channel, as well as the sticky error status 328 for the alignment of the received 66-bit word. It should be noted that the current lock circuitry operates on short words that are 13/14 bits wide and, as such the hybrid barrel shifter 316 may also work with the same word boundaries. This may reduce the complexity of the barrel shift operation in situation such as when the words have lengths of 66-bits. Since 66-bits can be decomposed in 5 short words, slipping of a short word is done through bit slip circuitry 314.

Figure 10:
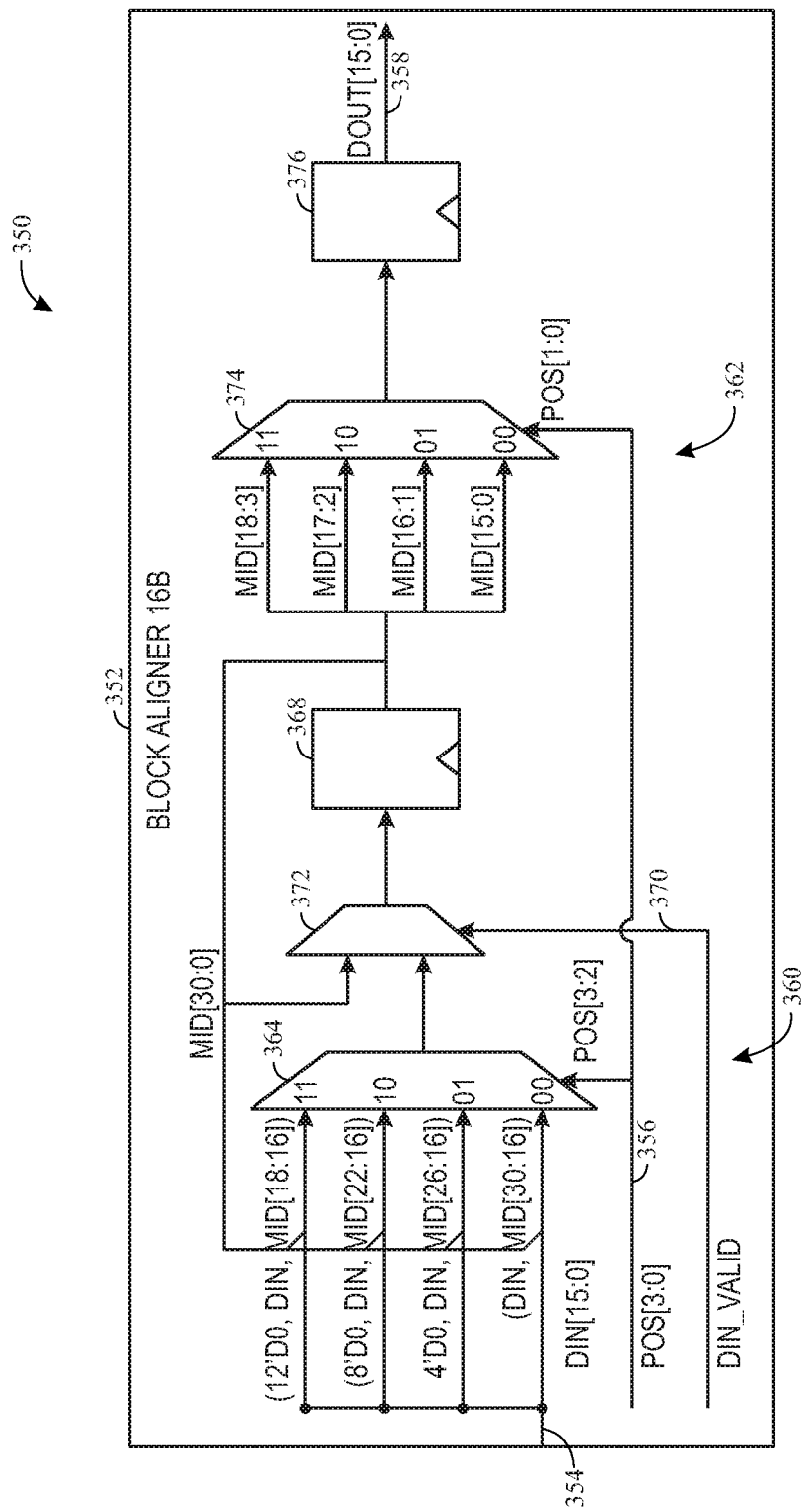
FIG. 10 illustrates an implementation of a 16-bit barrel-shift circuitry that may be used in the receiver side circuitry of FIG. 2, in accordance with an embodiment.

Diagram 350 in FIG. 10 illustrates an implementation of a 16-bit barrel shifter 352 that may be employed in word locking circuitry 110. Barrel shifter 352 may receive input data 354 and a shifting command 356, which may determine the number of bits to be shifted. Barrel shifter 352 may insert a shift from 0 to 15 bits. The shifted output 358 may be provided by the barrel shifter 352. Barrels shifter 352 may have a first stage 360 which may implement 0, 4, 8, or 12-bit shifts, and a second stage 362 which may implement 0, 1, 2, or 3-bit shifts. A first mux 364 may implement the barrel shifting of the first stage. The inputs of the first mux may be a concatenation of a section of the input data along with a rotated version (e.g., MID), as illustrated, to implement the barrel-shift circuitry. Output of the first mux 364 may be provided to a latch 368, which may be used to implement the rotation and output the rotated version of the input (e.g., MID). Note that barrel shifter 352 may receive a valid data flag 370. If the data is invalid according to valid data flag 370, valid data mux 372 may ignore the input data 354 as it invalid, and keep the rotated data MID in the latch. The second stage 362 may have a second mux 374 to implement the barrel shifting of the second stage. Since the barrel shifting in this second stage 362 is of either 0, 1, 2, or 3-bit shifts a selection of the subset of the rotated data MID stored in latch 368 may provide the desired bit shifting. An output latch 376 may be used to provide the output of the barrel shifter 352 in a synchronous manner.

Figure 11:
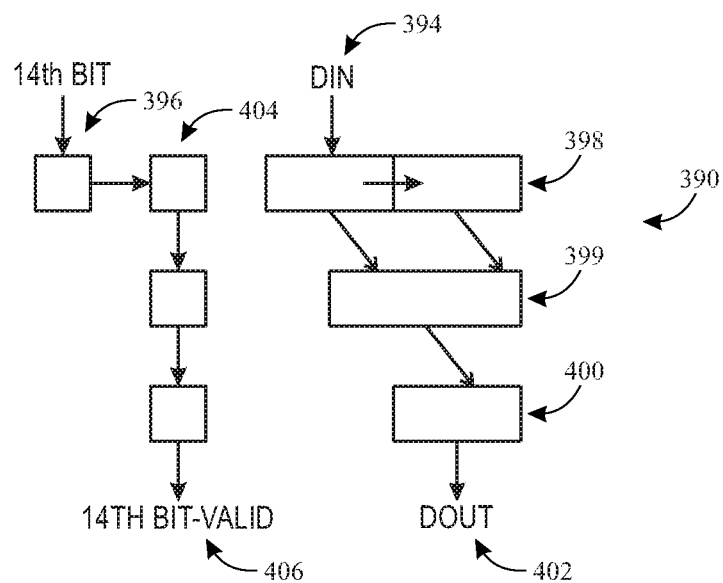
FIG. 11 illustrates a data path of a dual barrel-shift circuitry that may be used in the receiver side circuitry of FIG. 2, in accordance with an embodiment.

A 22-bit barrel shifter may be implemented in a similar manner. Such system may have a 3-stage barrel shifter, in which a first stage may implement a 0 or a 16 bit shift, a second stage may implement a 0, 4, 8, or 12-bit shift similar to that of first stage 360, and a third stage which may implement 0, 1, 2, or 3-bit shifts similar to that of second stage 362. An enable schedule having a 3 out of 5 cycles load and/or shift command may be used. As discussed above, the barrel shifter may receive short words of either 13 bits or 14 bits in certain embodiments. A dedicated dual barrel shifter capable of providing shifting to two different word lengths (e.g., 13-bit and 14-bit words) may also be implemented using the 3 stage strategy described above. FIG. 11 illustrates a data path 390 for the dual bit width barrel shifter. Data path may receive the input data 394. The 14th bit 396 may also be received in a dedicated input. The first stage 398 may implement 13 or 14-bit shifts to align the data based on the size of the short-word input data 394. This first stage 398, thus, may prevent the barrel shifter from adding an extraneous gap to the rotated data word during a concatenation in further stages. Second stage 399 may perform a 0, 4, 8, or 12-bit shift, similar to that of first stage 360. Third stage 400 may perform a 0, 1, 2, or 3-bit shifts, similar to that of second stage 362. As discussed above, the validity of the header with respect to the 14th bit may be processed in a dedicated pipeline 404, to provide an output that indicates whether the 14th bit is valid or not.

Figure 13:
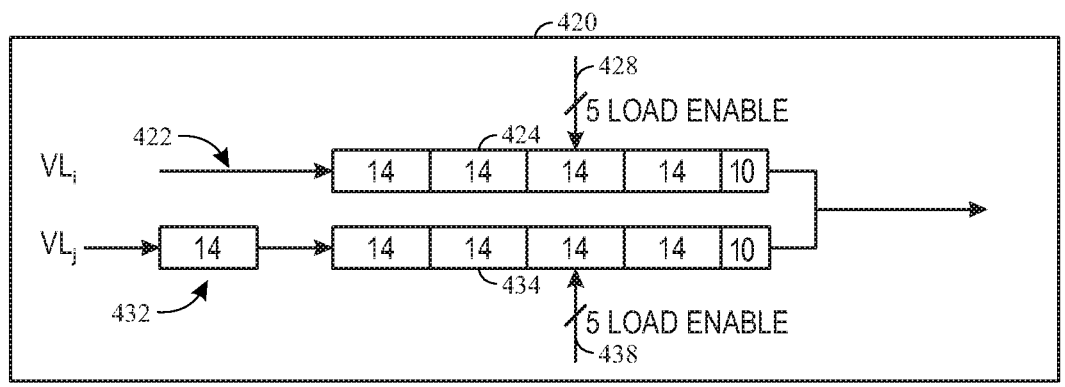
FIG. 13 illustrates a short-word scheduling converter that may be used to change from a variable short-word schedule to a fixed short-word schedule and may be used in the receiver side circuitry of FIG. 2, in accordance with an embodiment.

The virtual channels from the word locking circuitry may not be in the sequential order, as any virtual channel may arrive in any order. Therefore, a lane reordering circuitry 114 may be employed to arrange the arriving data. However, the data coming from the word locking circuitry 110 may be provided in groups of short words of different lengths in any order. As an example, the 66-bit Ethernet word may be received in 5 cycles as a set of four 13-bits word and one 14-bit word, where the 14-bit short word may occur in any of the cycles. A frame shift circuitry 112 may be used to re-schedule the data to a uniform schedule. In one embodiment, the may include shift frame module 451 (e.g., a shift register or buffer) that changes the stream from a variable schedule with four 13-bits and one 14-bits short words to a fixed schedule with four 14-bits and one 10-bits short words. FIG. 13 illustrates conversion circuitry 420 that may receive data in a 66-bit format with a variable schedule and may provide words in a fixed schedule. A first virtual lane input 422 may provide thus short words, which may be stored in a register 424. Once assembled in register 424, the virtual lanes may be provided as short words following the fixed short word scheduled.

In another embodiment, the shift frame module 451 may include a shift register or buffer that converts each short word of the schedule of four 13-bits and one 14-bits short word to a 15-bit short word to obtain a fixed schedule with 5 15-bits short words. In such embodiment, the shift frame module 451 may add to each short word a flag bit that identifies whether the 15-bits short word was converted from a 13-bit or a 14-bit short word may be used. This flag may be later employed by a decode module to strip the padded bits and re-assemble the original schedule of four 13-bits and one 14-bit short words. The fixed schedule may facilitate routing by the lane reordering circuitry 114.

Figure 12:
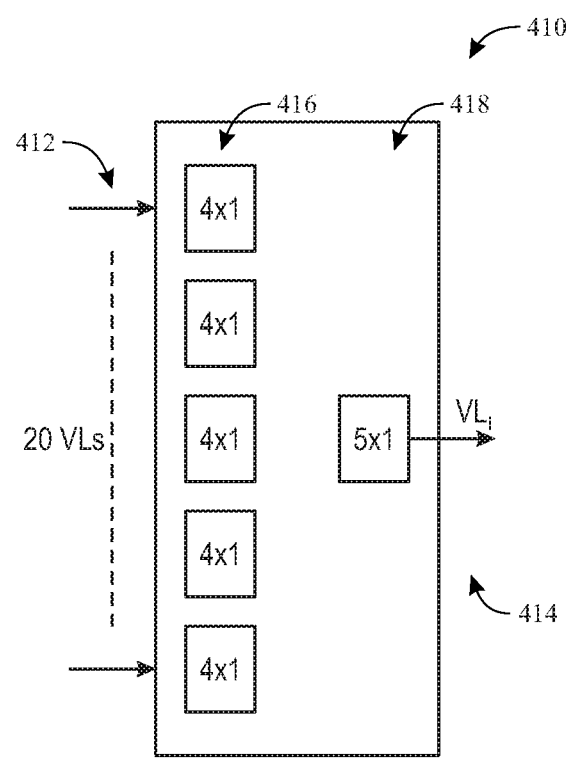
FIG. 12 illustrates lane reordering circuitry that may be used in the receiver side circuitry of FIG. 2, in accordance with an embodiment.

A lane reordering circuitry 114 may include a lane reordering module 410, which is illustrated in FIG. 12. Lane reordering module 410 may receive the short words input 412 from one of the 20 virtual lanes and may provide the short words in an output 414 that follows the sequential order. Lane reordering module 410 may be formed by a single multiplexer (e.g., a 20×1 multiplexer) that selects the input based on the order of the virtual lanes the short words input 412. In certain embodiments, such as in soft logic embodiments, the lane reordering module 410 may be formed by a network of multiplexers that couple an ingress stage 416 in which the short words input 412 is first received at an ingress stage 416. The words in ingress stage 416 may be directed to inputs of a multiplexer in the egress stage 418 based on the order of the virtual lanes. Moreover, certain embodiments may reorder the inputs employing a Clos network that includes an ingress stage, an egress stage, and a middle layer. Each of the stages in the Clos network may include multiple multiplexers. The lane reordering module 410 may include a controller to adjust the multiplexers.

Tag decoding and reframing circuitry 115 may receive the sequences of short words from the lane reordering circuitry 114. Tag decoding and reframing circuitry 115 may detect the alignment (e.g., skew) of the received words, and may tag the stream with alignment markers. The alignment marking may be associated with the relative position of the short words with respect to the 66-bit Ethernet word. In some embodiments, the tag decoding and reframing circuitry 115 may reconstruct the original scheduling. To perform these operations, each tag decode module 441 may receive 5 short words and, thus, the circuitry may operate in each short word individually, following a pipelined process. In some implementations, tag decode modules 441 may include dedicated circuitry to process the 5 packages in parallel, which may further decrease the latency. The alignment information may be inserted in the packages and forwarded to deskew and alignment locking circuitry 116.

Deskew and alignment locking circuitry 116 may seek alignment marker bits in the received packages and compensate skews identified in the channels. As discussed above, Ethernet transmission that employs multiple physical channels may include alignment marker bits that may be used for deskewing. Receiver side PMA and PCS circuitry 100 receives 20 virtual lanes over four physical channels, as discussed above. Each physical channel may have a particular skew, or phase delay. That information may be provided in the form of an alignment marker which may be added the tag decode module, as discussed above.

Figure 14:
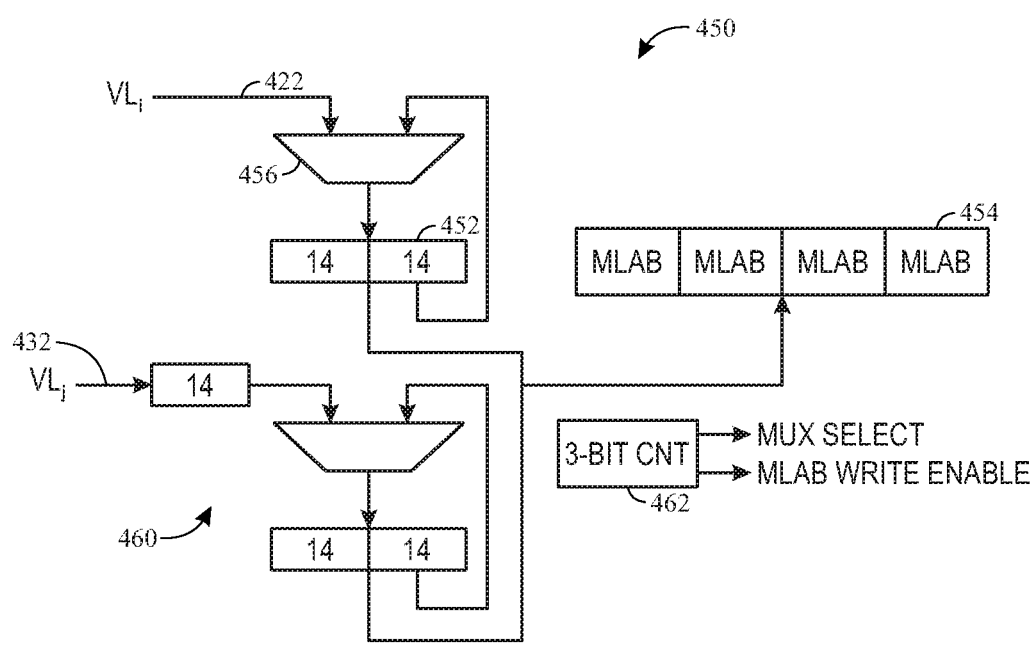
FIG. 14 illustrates an alternative short-word to long-word converter that may be used in the receiver side circuitry of FIG. 2, in accordance with an embodiment.

FIG. 14 illustrates another conversion circuitry 450 that may be used to assemble the 66-bit words from the short words. In circuitry 450, the short words received in virtual lane input 422 may be stored pair-wise in 28-bit registers, and may be stored in memory 454. Since the data in input 422 arrives scheduled as short-words, to fill in the 28-bit registers a feedback concatenation that employs multiplexer 456 may be used to fill the register. Second virtual lane input 432 may employ a similar feedback concatenation circuitry 460 to fill 28-bit registers prior to storing the received short words in memory 454. A 3-bit counter 462 may be further use to control multiplexer 456 that is used to fill the register, and to control the memory writing command prior to storing data in the memory 454. Note that conversion circuitry 450 may assemble 67-bit words without performing any deskewing, and therefore memory 454 may be used to perform the deskewing.

Figure 15:
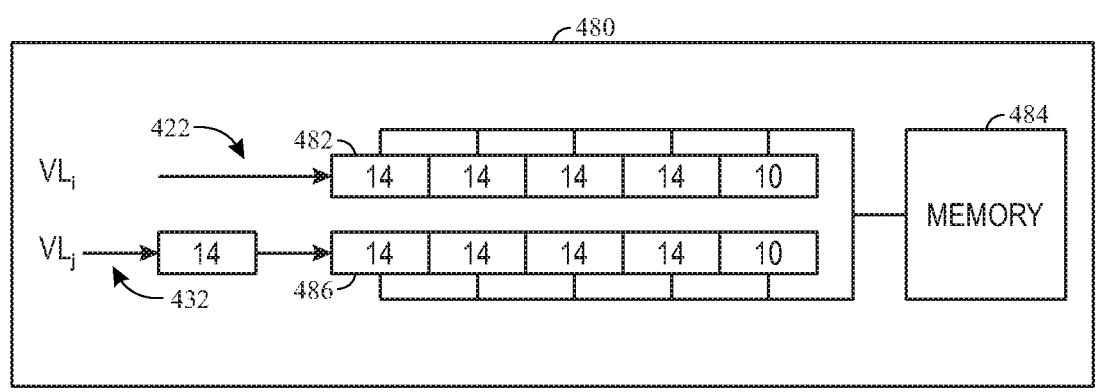
FIG. 15 illustrates a short-word to long-word converter that does not employ clocked write enable commands, and may be used in the receiver side circuitry of FIG. 2, in accordance with an embodiment.

FIG. 15 illustrates another conversion circuitry 480 that may be used to assemble 66-bit words from the short words received from the lane reordering circuitry 114. The conversion circuitry 480 may receive an extra alignment marker bit from the tag decoder 441. In conversion circuitry 480, short words in inputs 422 and 432 associated to a respective virtual lane may be provided to shift registers 482 and 486, respectively. The contents of shift registers 482 and 486 may be stored in memory 484 at every cycle, using the above-described fixed schedule. In conversion circuitry 480, the memory 484 may capture the contents of the shift registers 482 and 486 to facilitate implementation of the deskewing and/or alignment of the Ethernet packages assembled according to the alignment marker.

Figure 16:
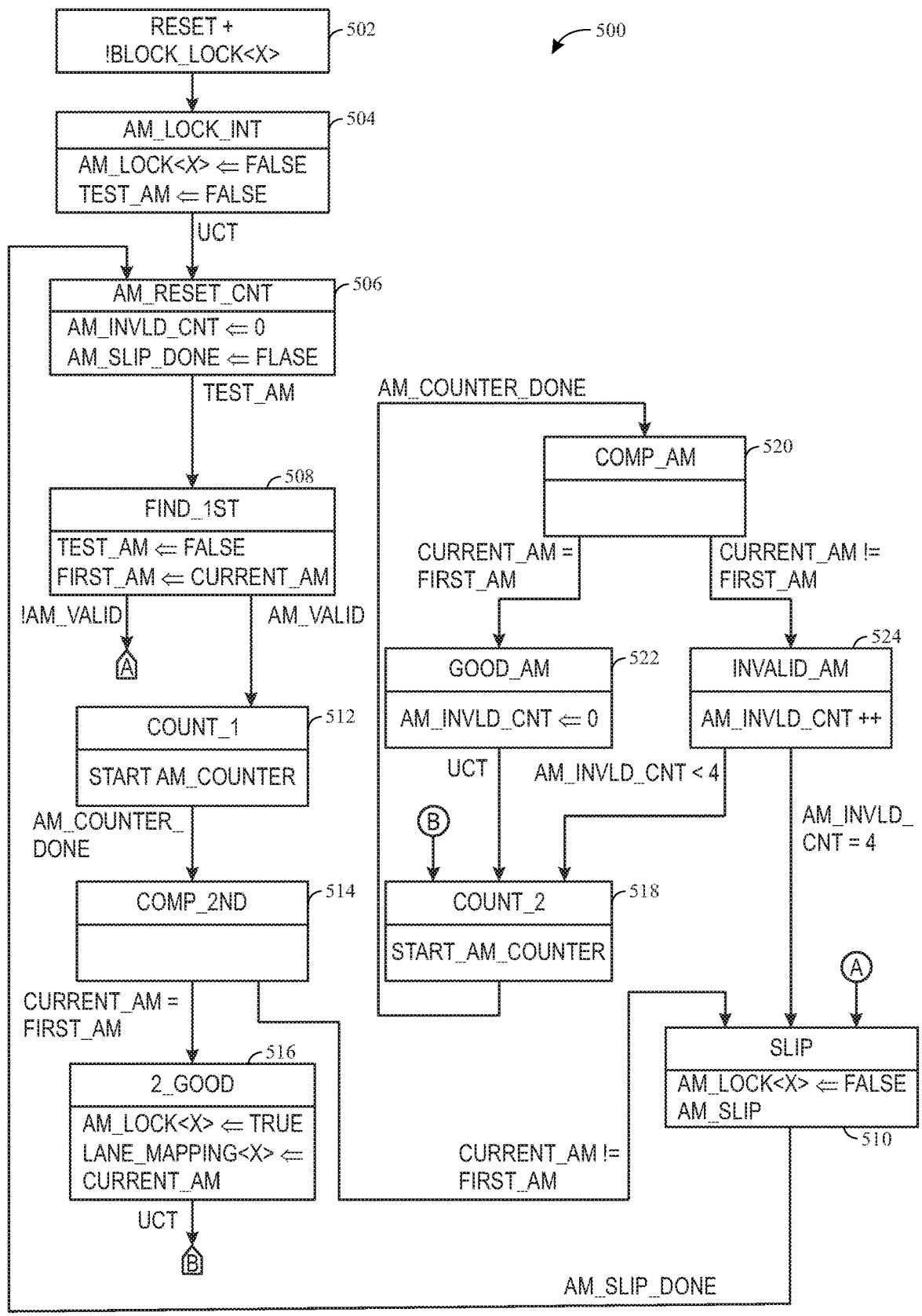
FIG. 16 illustrates a method for verifying alignment of words based on an alignment marker, and may be used in the receiver side circuitry of FIG. 2, in accordance with and embodiment.

The flow chart in FIG. 16 illustrates a method 500 for monitoring of an alignment marker and providing an alignment marker lock. The method 500 illustrated in flow chart may verify if the period of the align alignment markers is correct. Method 500 may check if, after a specific period is expired, an alignment marker has been received. If the alignment was not received, the system may slip checking by one cycle. The method 500 may also provide alignment marker lock state, for compliance with the IEEE 802.3 specifications. Following a reset process 502, the alignment marker lock state may be set to false and the testing alignment marker flag may be set to false 504. In a counter reset process 506, the invalid alignment marker counter (AM_INVLD_CNT) may be reset and a slip flag (AM_SLIP_DONE) may be reset. The method 500 may test for the presence of an alignment marker (process 508). If the alignment marker is not identified (i.e., not valid), method 500 may change the alignment marker lock state to FALSE and request a bit slip (process 510), which may result in adjustment to delays in the virtual lane, as discussed above. Once the slip is performed, the method 500 may return to the counter reset process 506 and seek the alignment marker.

If, following process 508, the alignment marker is found, a counter may be reset in process 512. The counter may be used by method 500 to locate an address and/or an event in which the next alignment marker should be found. At the end of the counter, method 500 may test for a presence of a second alignment marker (process 514). If the current alignment marker does not correspond to the previously identified alignment marker, the alignment marker lock is set to FALSE and a 1-cycle slip is requested (process 510). If the current alignment marker corresponds to the previously identified alignment marker, the alignment marker lock may be set for TRUE and the lane mapping may be associated with current alignment marker (process 516).

Following this process 516, a counter may be reset in process 518, while the alignment marker state is TRUE. As in counter reset in process 512, the counter reset in process 518 may be used to locate and address and/or an event in which the next alignment marker should be found. At the end of the counter, presence of the alignment marker may be tested in process 520. If the alignment marker identified corresponds to the first alignment marker, the invalid counter may be reset (process 522) and the counter may be reset in process 518. If an alignment marker identified in process 520 does not correspond to the first alignment marker, the invalid alignment marker counter (AM_INVLD_CNT) may be incremented (process 524). If the invalid alignment marker counter is smaller than 4, the counter may be again reset in process 518. However, if the alignment marker counter reaches 4, indicating that four consecutive alignment markers failed to correspond to the first alignment marker, method 500 may set the alignment marker lock to FALSE and request an alignment marker slip in process 510. The above-described method 500 may be, in some implementations, performed by an alignment monitor 540 of the alignment locking circuitry 116. The slip requests from the alignment monitor 540 may be provided to a series of deskew buffers 542. Some implementations may include a deskew controller circuitry 546 that may coordinate the slip requests and/or perform the alignment marker checks used by alignment monitor 540. Deskew controller circuitry 546 may also perform scheduling tasks.

Figure 17:
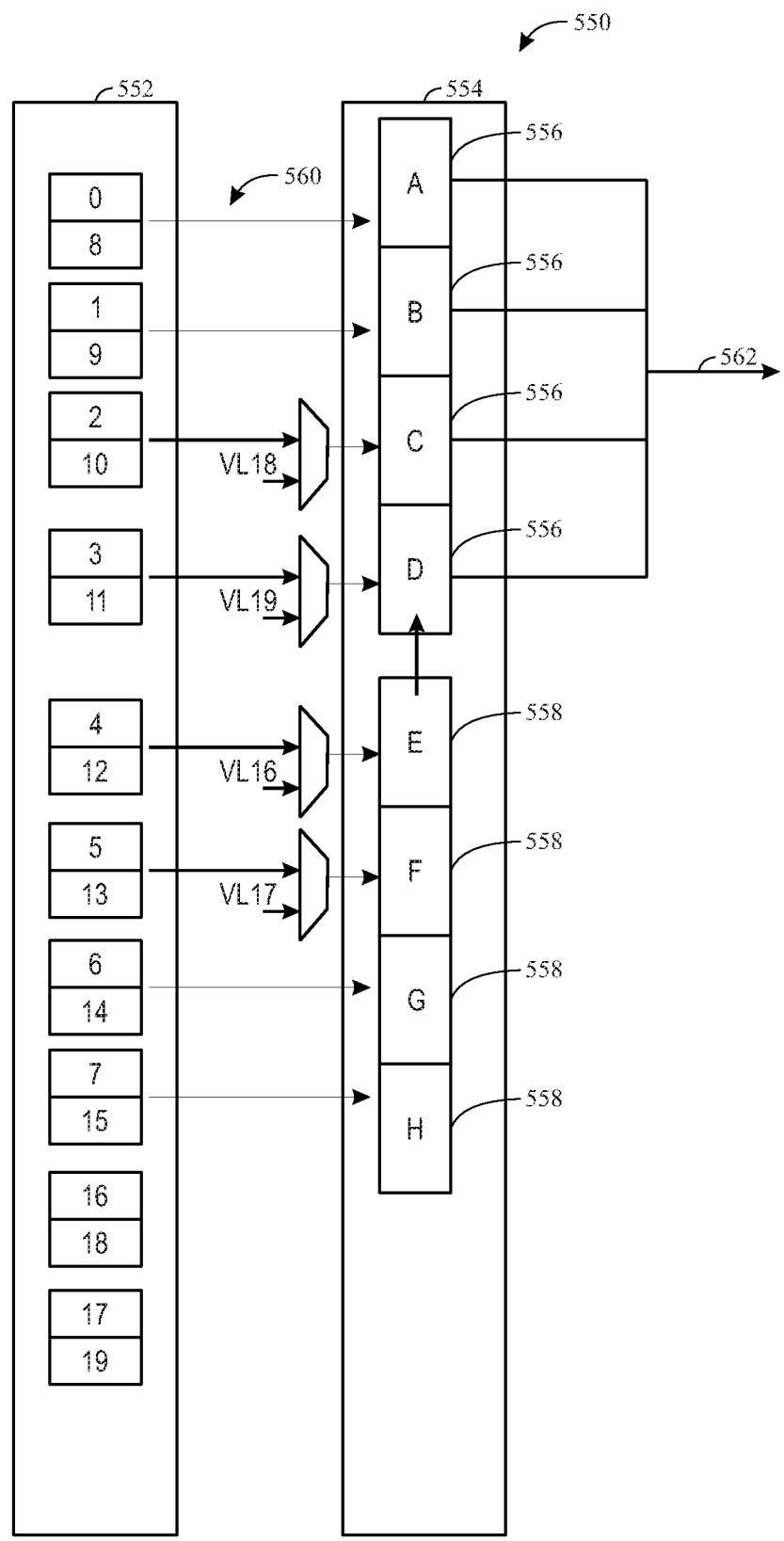
FIG. 17 illustrates a virtual-lane to word mapping circuitry that may be used in the receiver side circuitry of FIG. 2, in accordance with an embodiment.

Deskew and alignment circuitry may provide assembled 66-bit Ethernet words to a virtual lane to word mapping circuitry 118. The circuitry may be performed by mapping circuitry 550, illustrated in FIG. 17. Mapping circuitry 550 may receive the 20 words provided by an egress interface 552 of the deskew and alignment locking circuitry 116. Ingress interface 554 of the word mapping may have memory elements 556 and 558 that may be configured to receive the 66-bit words from egress interface 552. Egress interface 552 and ingress interface 554 may be coupled by a bus 560 that allows the transfer of 8 words of 66 bits per clock cycle. The output 562 of mapping circuitry 550 may be 4 words of 66 bits per clock cycle. Accordingly, mapping circuitry 550 may perform a 5-cycle transfer having load and shift cycles. In a first clock cycle, words 0-7 in egress interface 552 may be loaded to ingress interface 554. Words 0-3 may be stored in memory elements 556, and words 4-7 may be stored in memory elements 558. Accordingly, words 0-3 stored in memory elements 556 may be provided as output 562 of the first clock cycle. In a second clock cycle, words stored in elements 558 (i.e., 4-7) may be shifted to memory elements 556 and provided as output 562.

In a third clock cycle, words 8-15 may be loaded to memory elements 556 and 558, and memory elements 8-11 stored in memory elements 556 may be provided as output 562. In a fourth clock cycle, words 12-15 may be shifted from memory elements 558 to memory elements 556 and provided as output 662. In this cycle, words 16 and 17 may be loaded to elements of the ingress interface 552, as indicated. In a fifth cycle, the two words 16 and 17 may be shifted to memory elements 556, and words 18 and 19 may be loaded to the available memory elements 556. As a result, in the fifth clock cycle, words 16-19 may be provided as output 662. The routing of the words during the loading stage through bus 560 may be performed by employing multiplexers or LUTs associated to MLAB elements or other memory.

The ordered bits from the virtual lane to word mapping circuitry 550 may be forwarded to descrambling circuitry 120. Descrambler circuitry may implement the polynomial descrambling method as specified in the IEEE 802.3 specifications. Descrambling may, for example, employ $x^{58}+x^{39}+1$ polynomial descrambling method, as specified in the IEEE 802.3ba specification. The specific implementation of the descrambler may be chosen to match the scrambling method employed by the transmitter of the data. It should be noted that the descrambling circuitry 120 may have multiple descrambling methods implemented, and the specific descrambling method may be chosen dynamically.

The descrambled 66-bit words may be forwarded to a MII decoding circuitry 122, which may perform a 66 to 64 bit conversion. This conversion may include removal of the 2-bit header of the Ethernet word. MII decoder may further parse the 66-bit words to identify instructions to be performed in the PCS layer or in the MAC layer, and translate into the appropriate MII commands. In some implementations, the MII commands may be sent via a management data input/output (MDIO) bus to the MAC layer. The output of the MII decoding circuitry may be forwarded to the MAC layer circuitry of the electrical device.

The systems and methods described herein may be used to implement a receiver side PCS layer of Ethernet using programmable logic circuitry. It should be noted that the methods and circuitry above described may also be implemented employing hardened circuitry. Note further that certain circuits are arranged in modules to facilitate individual testing and integration. As such, the arrangement of the pipeline illustrated in FIG. 2 may be re-ordered, and some of the depicted functionalities may be removed and/or implemented by different circuitry.

Note further that many of the modules described may be usefully employed in other circuitry, such as transmitter circuitry, or circuitry that implements other protocols, such as Peripheral Component Interconnect (PCI), PCI Express, Universal Serial Bus (USB), or other communication protocols. Circuitry described herein may further be adapted to be used in communication systems for wireless communication, such as the IEEE 802.11 standards and Bluetooth standard. Many systems and methods described herein make reference to specific data bandwidths, word sizes, and arrangements. It should be noted that the bit sizes for words, the number of channels and/or virtual lanes and other specific descriptions are provided as an example of an implementation that may be used for compliance with high speed Ethernet protocols, and further, that the systems described herein may be modified due to changes in word sizes, number of channels and/or number of virtual lanes.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

Embodiments of the Current Application

Clause A1. Receiver circuitry, comprising:
 a plurality of transceivers, each transceiver configured to couple to a physical channel;
 a plurality of clock and data recovery circuitries, each clock and data recovery circuitry coupled to a transceiver and configured to provide digital data signal of a plurality of digital data signals and a recovered clock signal of a plurality of recovered clock signals;
 adaptor circuitry configured to receive the plurality of digital data signals and the recovered clock signals and provide the plurality of digital data signal clocked by a single clock signal; and
 physical coding sublayer (PCS) circuitry configured to receive the digital data from physical media access (PMA)

circuitry and provide data to a media access controller (MAC) circuitry in a media independent interface (MII) standard, and wherein the PCS circuitry employs the single clock signal for synchronization.

Clause A2. The receiver circuitry of clause A1, wherein the adaptor circuitry comprises a plurality of elastic buffers, wherein each elastic buffer:

receives a digital data signal and a recovered clock signal corresponding to the digital data signal, wherein the recovered clock signal latches an input of the respective elastic buffer; and provide the digital data signal clocked by the single clock signal.

Clause A3. The receiver circuitry of clauses A1 or A2, wherein the single clock signal is generated from one of the plurality of recovered clock signals.

Clause A4. The receiver circuitry of any of clauses A1-A3, wherein each digital data signal comprises a plurality interleaved virtual lanes, and wherein the PCS circuitry comprises de-interleaving circuitry that receives the digital data signal and provides a de-interleaved data signal clocked by the single clock signal.

Clause A5. The receiver circuitry of any of clauses A1-A4, wherein the PCS comprises word locking circuitry clocked by the single clock signal, the word locking circuitry configured to:

receive a plurality of short words associated to a long word;

identify a header of in each received short word;

determine a validity of the header in each received short word;

determine a validity of a header of the long word on the validity of each short word; and generate a bit-slip request based on the validity of the header of the long word.

Clause A6. The receiver circuitry of clause A5, wherein each received short word of the plurality of short words comprises a 13-bit or a 14-bit word and the long word comprises a 66 bit Ethernet word.

Clause A7. The receiver circuitry of any of clauses A5 or A6, wherein the word locking circuitry comprises a barrel-shift circuitry and multi-bit slip circuitry.

Clause A8. The receiver circuitry of clause A7, wherein the barrel-shift circuitry comprises a dual barrel-shift circuitry configured to shift a 13-bit word and a 14-bit word.

Clause B1. Receiver circuitry, comprising:

transceiver circuitry that receives digital data from a physical channel, wherein the digital data comprises a plurality of interleaved virtual lanes, each virtual lanes comprising a long word;

de-interleaving circuitry that de-interleaves the virtual lanes of the digital data to produce a plurality of short words, wherein each short word corresponds to a long word;

word locking circuitry configured to receive the plurality of short words, and provide a plurality of locked short words based on a header of the long word;

lane reordering circuitry configured to receive the plurality of locked short words and provide a plurality of sequences of ordered short words, wherein each sequence of ordered short words are arranged to form the corresponding long word; and conversion circuitry configured to receive the plurality of sequences of ordered short words and provide the corresponding long word.

Clause B2. The receiver circuitry of clause B1, wherein each channel comprises 5 virtual lanes.

Clause B3. The receiver circuitry of clause B1 or B2, wherein each long word comprises a 66-bit word and each short word comprises a 13-bit word or a 14-bit word.

Clause B4. The receiver circuitry of any of clauses B1-B3, wherein the de-interleaving circuitry and the word locking circuitry is implemented in a programmable logic device.

Clause B5. The receiver circuitry of any of clause B1-B4, comprising deskewing circuitry that receives the plurality of sequences of ordered short words and provides a plurality of aligned sequences of short words, wherein the deskewing circuitry aligns each sequences of ordered short words of sequences of ordered short words based on an alignment marker of the corresponding long word.

Clause B6. The receiver circuitry of any of clause B1-B5, wherein the lane reordering circuitry is configured to convert each sequence of ordered short words into a sequence of modified uniform scheduled short words.

Clause B7. The receiver circuitry of any of clauses B1-B6, wherein the word locking circuitry is configured to:

identify a header of in each received short word;

determine a validity of the header in each received short word;

determine a validity of a header of the long word is valid based on the validity of the header of each short word; and generate a bit-slip request based on the validity of the header of the long word.

Clause B8. The receiver circuitry of any of clause B7, wherein the word locking circuitry comprises dual barrel-shifter circuitry configured to perform a shifting for at least two word lengths.

Clause B9. The receiver circuitry of clause B8, wherein the at least two word lengths comprise a 13-bit word length and a 14-bit word length.

Clause C1. A method, comprising:

receiving a plurality of digital signals, wherein each digital signal comprises a plurality of interleaved virtual lanes, each virtual lane is configured to transport long words;

for each digital signal, de-interleaving the virtual lanes of a respective digital signal to produce a plurality of short words, wherein each short word corresponds to a long word;

for each digital signal, validating a header of the long word of each virtual lane using the plurality of short words and providing bit-slip request based on the validation of the header of the long word;

for each digital signal, forming an ordered sequence of short words from the plurality of short words, wherein the ordered sequence of short words is ordered to form the corresponding long word transported by the virtual lane; and converting the ordered sequence of short words into long words.

Clause C2. The method of clause C1, comprising deskewing each virtual channel based on an alignment marker of long word transported by the virtual lane.

Clause C3. The method of any of clauses C1 or C2, wherein the plurality of digital signals conform to an Ethernet standard.

What is claimed is:

1. Receiver circuitry, comprising:
 a plurality of transceivers, each transceiver configured to couple to a physical channel;
 a plurality of clock and data recovery circuitries, each clock and data recovery circuitry coupled to a transceiver and configured to provide digital data signal of a plurality of digital data signals and a recovered clock signal of a plurality of recovered clock signals;

adaptor circuitry configured to receive the plurality of digital data signals and the recovered clock signals and provide the plurality of digital data signal clocked by a single clock signal; and physical coding sublayer (PCS) circuitry configured to receive the digital data from physical media access (PMA) circuitry and provide data to a media access controller (MAC) circuitry in a media independent interface (MII) standard, and wherein the PCS circuitry employs the single clock signal for synchronization.

2. The receiver circuitry of claim 1, wherein the adaptor circuitry comprises a plurality of elastic buffers, wherein each elastic buffer:

receives a digital data signal and a recovered clock signal corresponding to the digital data signal, wherein the recovered clock signal latches an input of the respective elastic buffer; and provide the digital data signal clocked by the single clock signal.

3. The receiver circuitry of claim 1, wherein the single clock signal is generated from one of the plurality of recovered clock signals.

4. The receiver circuitry of claim 1, wherein each digital data signal comprises a plurality interleaved virtual lanes, and wherein the PCS circuitry comprises de-interleaving circuitry that receives the digital data signal and provides a de-interleaved data signal clocked by the single clock signal.

5. The receiver circuitry of claim 1, wherein the PCS comprises word locking circuitry clocked by the single clock signal, the word locking circuitry configured to:

receive a plurality of short words associated to a long word;

identify a header of in each received short word;

determine a validity of the header in each received short word;

determine a validity of a header of the long word on the validity of each short word; and generate a bit-slip request based on the validity of the header of the long word.

6. The receiver circuitry of claim 5, wherein each received short word of the plurality of short words comprises a 13-bit or a 14-bit word and the long word comprises a 66 bit Ethernet word.

7. The receiver circuitry of claim 5, wherein the word locking circuitry comprises a barrel-shift circuitry and multi-bit slip circuitry.

8. The receiver circuitry of claim 7, wherein the barrel-shift circuitry comprises a dual barrel-shift circuitry configured to shift a 13-bit word and a 14-bit word.

9. Receiver circuitry, comprising:

transceiver circuitry that receives digital data from a physical channel, wherein the digital data comprises a plurality of interleaved virtual lanes, each virtual lanes comprising a long word;

de-interleaving circuitry that de-interleaves the virtual lanes of the digital data to produce a plurality of short words, wherein each short word corresponds to a long word;

word locking circuitry configured to receive the plurality of short words, and provide a plurality of locked short words based on a header of the long word;

lane reordering circuitry configured to receive the plurality of locked short words and provide a plurality of sequences of ordered short words, wherein each sequence of ordered short words are arranged to form the corresponding long word; and conversion circuitry configured to receive the plurality of sequences of ordered short words and provide the corresponding long word.

10. The receiver circuitry of claim 9, wherein each channel comprises 5 virtual lanes.

11. The receiver circuitry of claim 9, wherein each long word comprises a 66-bit word and each short word comprises a 13-bit word or a 14-bit word.

12. The receiver circuitry of claim 9, wherein the de-interleaving circuitry and the word locking circuitry is implemented in a programmable logic device.

13. The receiver circuitry of claim 9, comprising deskewing circuitry that receives the plurality of sequences of ordered short words and provides a plurality of aligned sequences of short words, wherein the deskewing circuitry aligns each sequences of ordered short words of sequences of ordered short words based on an alignment marker of the corresponding long word.

14. The receiver circuitry of claim 9, wherein the lane reordering circuitry is configured to convert each sequence of ordered short words into a sequence of modified uniform scheduled short words.

15. The receiver circuitry of claim 9, wherein the word locking circuitry is configured to:

identify a header of in each received short word;

determine a validity of the header in each received short word;

determine a validity of a header of the long word is valid based on the validity of the header of each short word; and generate a bit-slip request based on the validity of the header of the long word.

16. The receiver circuitry of claim 9, wherein the word locking circuitry comprises dual barrel-shifter circuitry configured to perform a shifting for at least two word lengths.

17. The receiver circuitry of claim 16, wherein the at least two word lengths comprise a 13-bit word length and a 14-bit word length.

18. A method, comprising:

receiving a plurality of digital signals, wherein each digital signal comprises a plurality of interleaved virtual lanes, each virtual lane is configured to transport long words;

for each digital signal, de-interleaving the virtual lanes of a respective digital signal to produce a plurality of short words, wherein each short word corresponds to a long word;

for each digital signal, validating a header of the long word of each virtual lane using the plurality of short words and providing bit-slip request based on the validation of the header of the long word;

for each digital signal, forming an ordered sequence of short words from the plurality of short words, wherein the ordered sequence of short words is ordered to form the corresponding long word transported by the virtual lane; and converting the ordered sequence of short words into long words.

19. The method of claim 18, comprising deskewing each virtual channel based on an alignment marker of long word transported by the virtual lane.

20. The method of claim 18, wherein the plurality of digital signals conform to an Ethernet standard.

* * * * *